United States Patent
Eriksson et al.

(10) Patent No.: US 12,545,255 B2
(45) Date of Patent: Feb. 10, 2026

(54) SITUATION BASED UNDER SPEED FOR A PREDICTIVE CRUISE CONTROL

(71) Applicant: VOLVO TRUCK CORPORATION, Gothenburg (SE)

(72) Inventors: Anders Eriksson, Torslanda (SE); Olof Lindgärde, Hovås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 106 days.

(21) Appl. No.: 18/426,750

(22) Filed: Jan. 30, 2024

(65) Prior Publication Data
US 2024/0253631 A1 Aug. 1, 2024

(30) Foreign Application Priority Data

Jan. 30, 2023 (EP) ...................................... 23153846

(51) Int. Cl.
*B60W 30/16* (2020.01)
*B60W 40/105* (2012.01)
(Continued)

(52) U.S. Cl.
CPC ........ *B60W 30/162* (2013.01); *B60W 40/105* (2013.01); *G08G 1/0125* (2013.01);
(Continued)

(58) Field of Classification Search
CPC .. B60W 30/143; B60W 30/146; B60W 30/16; B60W 30/162; B60W 40/076;
(Continued)

(56) References Cited

U.S. PATENT DOCUMENTS

| | | | | |
|---|---|---|---|---|
| 2011/0196592 | A1* | 8/2011 | Kashi | .................. B60W 50/085 701/96 |
| 2011/0276216 | A1 | 11/2011 | Vaughan | |

(Continued)

FOREIGN PATENT DOCUMENTS

| | | | | | |
|---|---|---|---|---|---|
| CN | 114906140 | A | * | 8/2022 | ............ B60W 40/06 |
| CN | 114954452 | A | * | 8/2022 | .......... B60W 30/143 |

(Continued)

OTHER PUBLICATIONS

Extended European Search Report, European Patent Application No. 23153846.3, mailed Jul. 26, 2023, 8 pages.

*Primary Examiner* — Atul Trivedi
(74) *Attorney, Agent, or Firm* — Sage Patent Group

(57) ABSTRACT

A computer system comprising a processor device configured to: control a prime mover of the first vehicle to operate the first vehicle at a target set speed, determine a rear traffic condition indicating whether there is a risk of being overtaken by a second vehicle travelling behind the first vehicle, determine a topography of an upcoming road to be travelled by the first vehicle, and reduce the target set speed of the first vehicle from a nominal set speed, said nominal set speed being the current speed of the first vehicle, to a reduced set speed, in response to the indicating a descending road condition and the rear traffic condition not indicating a risk of being overtaken by the second vehicle before arriving at the descending road condition.

13 Claims, 2 Drawing Sheets

(51) Int. Cl.
  *G08G 1/01* (2006.01)
  *G08G 1/16* (2006.01)
(52) U.S. Cl.
  CPC ......... *G08G 1/167* (2013.01); *B60W 2552/15* (2020.02); *B60W 2554/804* (2020.02); *B60W 2555/60* (2020.02); *B60W 2720/10* (2013.01)
(58) Field of Classification Search
  CPC ........... B60W 40/105; B60W 2300/10; B60W 2300/12; B60W 2300/125; B60W 2300/17; B60W 2520/10; B60W 2552/15; B60W 2554/802; B60W 2554/804; B60W 2555/60; B60W 2720/10; B60W 2720/103; B60Y 2200/14; G08G 1/0125; G08G 1/167
  USPC .......................................................... 701/96
  See application file for complete search history.

(56) References Cited

U.S. PATENT DOCUMENTS

| | | | | |
|---|---|---|---|---|
| 2017/0291605 | A1 | 10/2017 | Grewal et al. | |
| 2019/0196487 | A1* | 6/2019 | Akiyama | B60W 30/18163 |
| 2022/0080967 | A1* | 3/2022 | Watanabe | B60W 60/0015 |
| 2022/0135039 | A1* | 5/2022 | Jardine | B60W 30/18163 701/26 |
| 2022/0176986 | A1* | 6/2022 | Lei | B60W 60/001 |
| 2022/0185290 | A1* | 6/2022 | Sanfridson | G08G 1/163 |
| 2022/0219716 | A1* | 7/2022 | McAlister | G08G 1/097 |
| 2022/0250614 | A1* | 8/2022 | Ota | B60W 30/09 |
| 2022/0306112 | A1* | 9/2022 | Yan | B60W 30/16 |
| 2022/0348227 | A1* | 11/2022 | Foster | B60Q 1/507 |
| 2022/0379924 | A1* | 12/2022 | Foster | B60W 30/16 |
| 2023/0139551 | A1* | 5/2023 | Zhao | B60W 30/18163 701/26 |
| 2024/0317216 | A1* | 9/2024 | Jo | B60W 30/09 |
| 2024/0375645 | A1* | 11/2024 | Perez Barrera | B60W 60/0027 |
| 2025/0100555 | A1* | 3/2025 | Beaurepaire | G06N 20/00 |

FOREIGN PATENT DOCUMENTS

| | | | | |
|---|---|---|---|---|
| CN | 115578878 A | * | 1/2023 | ....... G08G 1/096708 |
| CN | 117601854 A | * | 2/2024 | ............ B60W 30/09 |
| CN | 118212808 A | * | 6/2024 | ....... G08G 1/096775 |
| CN | 119389234 A | * | 2/2025 | ...... B60W 30/18163 |
| DE | 102016014958 A1 | | 6/2018 | |
| DE | 102022119760 A1 | * | 2/2024 | ........ B60W 30/0956 |
| EP | 3418152 B1 | * | 1/2023 | .......... B60W 30/143 |
| EP | 4209854 B1 | * | 5/2025 | ...... B60W 30/18163 |
| WO | WO-2022152984 A1 | * | 7/2022 | .......... B60W 30/162 |
| WO | WO-2022202256 A1 | * | 9/2022 | ............... G08G 1/16 |

* cited by examiner

SITUATION BASED UNDER SPEED FOR A PREDICTIVE CRUISE CONTROL

CROSS REFERENCE TO RELATED APPLICATIONS

This application claims foreign priority to European Patent Application No. 23153846.3, filed on Jan. 30, 2023, the disclosure and content of which is incorporated by reference herein in its entirety.

TECHNICAL FIELD

The disclosure relates generally to cruise control for road vehicles. In particular, the disclosure relates to predictive cruise control using topographic information to reduce fuel consumption by adjusting speed. The disclosure can be applied in heavy-duty vehicles, such as trucks, buses, and construction equipment. Although the disclosure may be described with respect to a particular vehicle, the disclosure is not restricted to any particular vehicle.

BACKGROUND

Cruise control systems are typically used in a vehicle to enable automatic speed control of the vehicle to keep the vehicle running close to a set speed. The set speed may be adjusted manually, by an operator of the vehicle, and/or may be adjusted automatically by the cruise control system. For example, a cruise control system may automatically adjust the target speed to a current road speed limit. A cruise control system may also/alternatively be adapted to adjust the target speed for fuel savings by lowering the target speed ahead of a descending road condition. When a vehicle travels downwards along a descending portion of a road, the potential energy of the vehicle translates to increased speed of the vehicle. If the vehicle speed increases above the road speed limit, the brakes of the vehicle may have to be applied to prevent the vehicle from going too fast. When applying the brakes of the vehicle, energy is typically dissipated in the form of heat caused by friction from the brakes. By instead reducing vehicle speed ahead of the descending road condition, less fuel is needed before reaching the road descent and the vehicle speed can increase without reaching the road speed limit, such that the brakes will not have to be applied, thereby saving fuel.

A second vehicle travelling behind a first vehicle has reduced sight ahead of the first vehicle and therefore might not be aware of an upcoming descending road condition. If the second vehicle begins overtaking the first vehicle, and the first vehicle suddenly begins accelerating, the overtaking will take longer time and the risk of an accident increases. Accordingly, it would be advantageous to reduce risks associated with a second vehicle overtaking a first vehicle.

SUMMARY

According to a first aspect of the disclosure, a computer system is provided. The computer system comprises a processor device configured to:
 a) control a prime mover of the first vehicle to operate the first vehicle at a target set speed,
 b) determine a rear traffic condition indicating whether there is a risk of being overtaken by a second vehicle travelling behind the first vehicle,
 c) determine a topography of an upcoming road to be travelled by the first vehicle, and
 d) reduce the target set speed of the first vehicle from a nominal set speed, said nominal set speed being the current speed of the first vehicle, to a reduced set speed, in response to the topography indicating a descending road condition and the rear traffic condition not indicating a risk of being overtaken by the second vehicle before arriving at the descending road condition.

The first aspect of the disclosure may seek to enable energy savings (fuel savings) in descending road conditions, whilst reducing risks associated with a second vehicle overtaking a first vehicle in descending road conditions. A technical benefit may include energy savings (fuel savings) and reduced risk of accidents at overtaking of a first vehicle by a second vehicle in a descending road condition.

A second aspect of the present disclosure relates to a computer-implemented method for controlling speed of a first vehicle. The computer-implemented method comprises:
 a) controlling, by a processor device of a computer system, a prime mover of the first vehicle to operate the first vehicle at a target set speed,
 b) determining, by the processor device, a rear traffic condition indicating whether there is a risk of being overtaken by a second vehicle travelling behind the first vehicle,
 c) determining, by the processor device, a topography of an upcoming road to be travelled by the first vehicle, and
 d) reducing, by the processor device, the target set speed of the first vehicle from a nominal set speed, said nominal set speed being the current speed of the first vehicle, to a reduced set speed, in response to the topography indicating a descending road condition and the rear traffic condition not indicating a risk of being overtaken by the second vehicle before arriving at the descending road condition.

The second aspect of the disclosure may seek to enable energy savings (fuel savings) in descending road conditions, whilst reducing risks associated with a second vehicle overtaking a first vehicle in descending road conditions. A technical benefit may include energy savings (fuel savings) and reduced risk of accidents at overtaking of a first vehicle by a second vehicle in a descending road condition.

In some examples, the step of determining the rear traffic condition may comprise:
 obtaining, by the processor device, distance information from a rear distance sensor of the first vehicle, said distance information describing at least a current distance between the first vehicle and the second vehicle, and
 processing, by the processor device, the distance information to determine the rear traffic condition based on at least the distance information.

Such use of a rear distance sensor provides a reliable indication as to the distance to a vehicle behind the first vehicle, such that relative speeds and accelerations/decelerations between the first and second vehicles can be derived based on data from the distance sensor. The distance sensor preferably provides the data in real-time, and works offline, i.e., without communication with other vehicles, and thus works also when the vehicle is outside of a range of wireless communication networks.

In alternative examples, real-time data may be available from an external data provider, said real-time data including information describing the position and speed of the first and second vehicles. The real-time data may be provided to the computer system via a wireless communications network.

In some examples, the method may further comprise:

f) increasing, by the processor device, the target set speed of the first vehicle from the reduced set speed to a current road speed limit, in response to the first vehicle not having arrived at the descending road condition and the rear traffic condition indicating a risk of being overtaken by the second vehicle. The current road speed limit may be the maximum legally allowed vehicle speed of the first vehicle at the location where the first vehicle is currently situated.

The increase of the set speed makes the first vehicle accelerate to the new set speed and the higher speed of the first vehicle reduces the incentive for the second vehicle to overtake the first vehicle. Since the target set speed is increased in response to the first vehicle not having arrived at the descending road condition when a risk of being overtaken is indicated, the risk of dangerous overtaking is reduced.

In some examples, the method may further comprise:

f) increasing, by the processor device, the target set speed of the first vehicle from the reduced set speed to the nominal set speed, in response to the first vehicle not having arrived at the descending road condition and the rear traffic condition indicating a risk of being overtaken by the second vehicle.

The increase of the set speed makes the first vehicle accelerate to the new set speed and the higher speed of the first vehicle reduces the incentive for the second vehicle to overtake the first vehicle. Since the target set speed is increased in response to the first vehicle not having arrived at the descending road condition when a risk of being overtaken is indicated, the risk of dangerous overtaking is reduced.

In some examples, the rear traffic condition may be determined to indicate a risk of being overtaken by the second vehicle before arriving at the descending road condition in response to a distance between the second vehicle and the first vehicle being below a predetermined rear distance limit.

By monitoring the distance between the first vehicle and the second vehicle and comparing the measured distance to a predetermined rear distance limit, it is possible to indicate a risk of being overtaken when the distance from the first vehicle to the second vehicle is small.

In some examples, the rear distance limit may be dynamically adjusted by the processor device in response to a change in road speed limit.

In some examples, the rear traffic condition may be determined to indicate a risk of being overtaken by the second vehicle before arriving at the descending road condition in response to a speed difference between the first vehicle and the second vehicle exceeding a speed difference limit.

In some examples, the speed difference limit may be a static predetermined limit. In some examples, the speed difference limit may instead be dynamically determined based on one or more of the speed of the first vehicle, the distance between the first vehicle and the second vehicle, and the distance between the first vehicle and the descending road condition. For example, the speed difference limit may be determined such that, as long as the second vehicle does not drive faster than a speed governed by the speed difference limit, the second vehicle is not able to get closer to the first vehicle than the predetermined rear distance limit before the first vehicle reaches the descending road condition.

In some examples, the reduced set speed may be determined by estimating, by the processor device, a speed increase of the first vehicle based on a vertical extent of the descending road condition, wherein a difference between the reduced set speed and the current speed of the first vehicle is proportional to the estimated speed increase of the first vehicle.

By dynamically adjusting the speed reduction based on the estimated speed increase related to the descending road condition, it is possible to save energy/fuel by reducing speed ahead of the descending road condition wherein the vehicle picks up a corresponding amount of speed in the descending road condition.

A third aspect of the present disclosure relates to a vehicle comprising the processor device to perform the computer-implemented method described above.

A fourth aspect of the present disclosure relates to a computer program product comprising program code for performing, when executed by the processor device, the computer-implemented method described above.

A fifth aspect of the present disclosure relates to a control system comprising one or more control units configured to perform the computer-implemented method described above.

A sixth aspect of the present disclosure relates to a non-transitory computer-readable storage medium comprising instructions, which when executed by the processor device, cause the processor device to perform the computer-implemented method described above.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

In FIGS. 1 and 2, V1=road speed limit, V2=vehicle speed, V3=target set speed, V4=nominal set speed, V5=reduced set speed, R=road topography, and X=travelling direction.

DETAILED DESCRIPTION

Aspects set forth below represent the necessary information to enable those skilled in the art to practice the disclosure.

Figure 1:
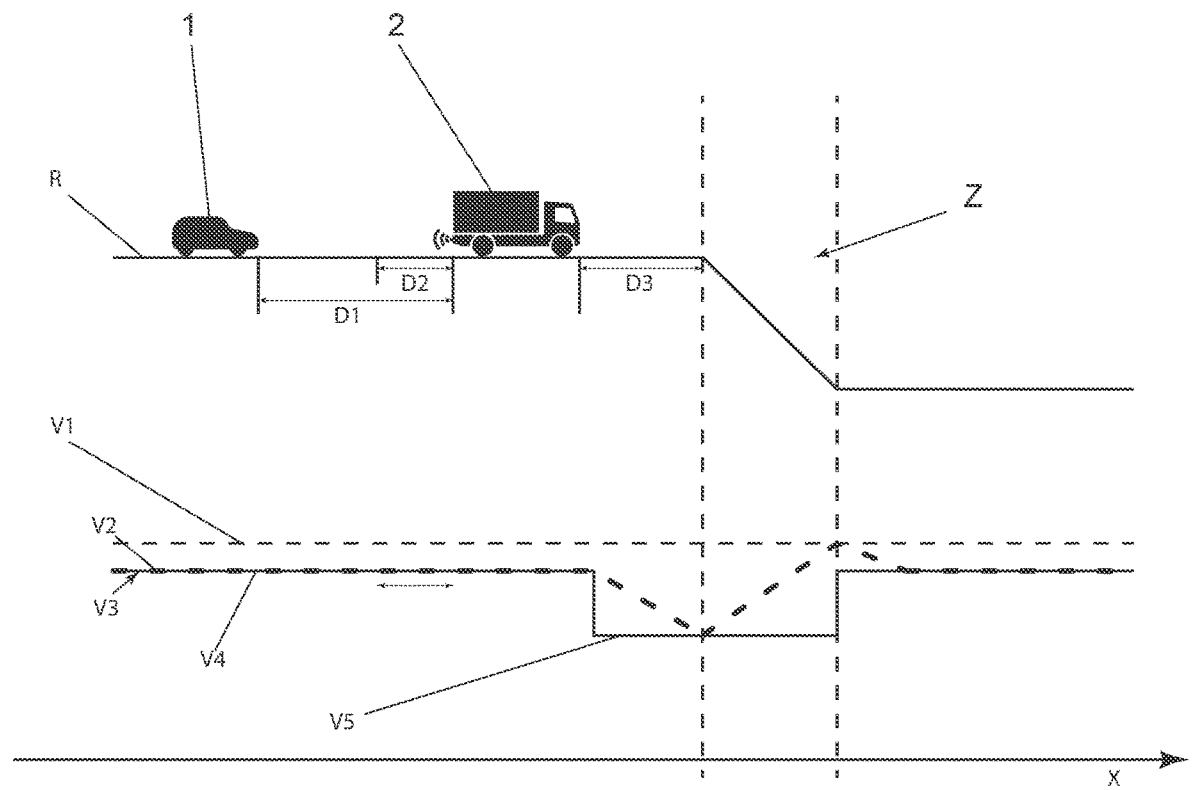
FIG. 1 shows a first driving scenario where no risk of overtaking is determined.

FIG. 1 shows a first driving scenario, where no risk of overtaking is determined. This corresponds to a rear traffic condition not indicating a risk of a first vehicle 2 being overtaken by a second vehicle 1.

Specifically, an upper portion of FIG. 1 shows the first vehicle 2 driving towards a descending road condition Z, i.e., towards a descending portion of the road to be travelled by the first vehicle 2. The second vehicle 1 is driving behind the first vehicle 2 at a distance D1 between the first vehicle 2 and the second vehicle 1. FIG. 1 also shows a predetermined rear distance limit D2.

A lower portion of FIG. 1 shows a road speed limit V1, and a vehicle speed V2 of the first vehicle 2 when controlled by a cruise control aiming to keep the vehicle speed V2 at a target set speed V3. As shown, the target set speed V3 is reduced before the first vehicle 2 reaches the descending road condition Z, in order to implement a fuel/energy saving strategy, wherein the speed of the first vehicle 2 gradually falls for a certain time period, until the first vehicle 2 starts descending and thus picking up speed. As she first vehicle 2 accelerates in the descending road condition Z, an overtaking vehicle may be surprised by the sudden acceleration, thus presenting an increased risk of accidents. Since the second vehicle 1 is rather far behind the first vehicle 2, a reduction of target set speed V3 ahead of the descending road condition Z, for fuel/energy saving purposes, is possible without the speed reduction before the descending road condition Z leading to an increased risk of the second vehicle 1 beginning to overtake the first vehicle 2.

Figure 2:
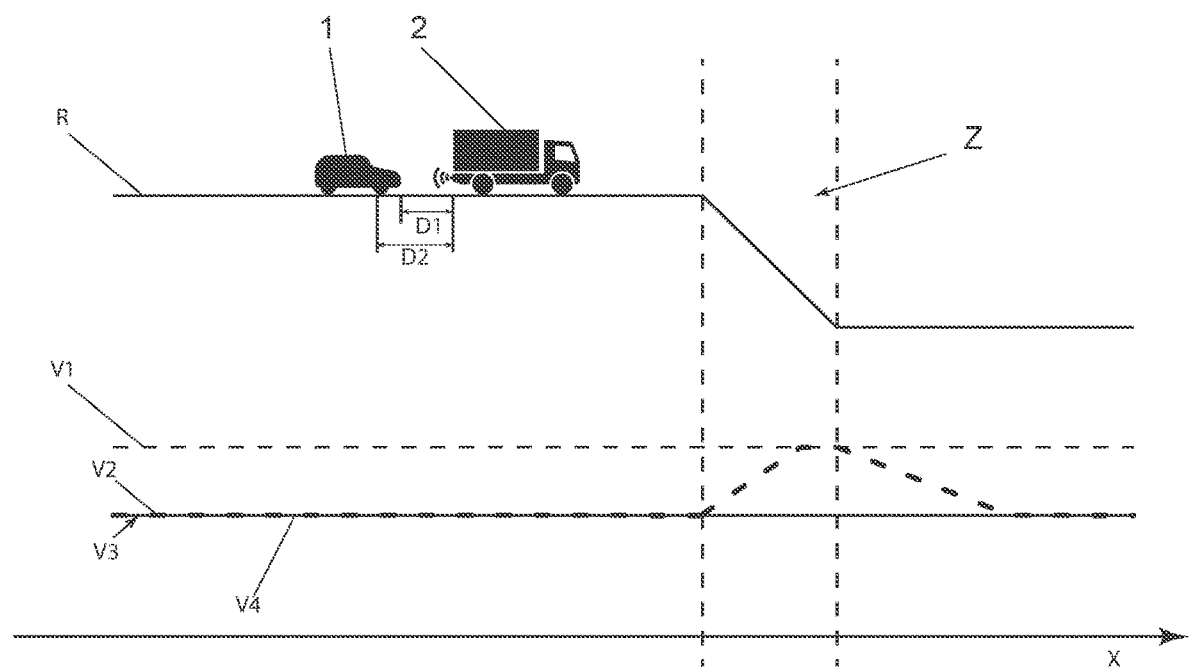
FIG. 2 shows a second driving scenario where a risk of overtaking is determined.

FIG. 2 shows a second driving scenario with a shorter distance D1 between the first vehicle 2 and the second vehicle 1, as compared to the distance D1 described above in relation to the first scenario shown in FIG. 1. A lower portion of FIG. 2 shows a road speed limit V1, and a vehicle speed V2 of the first vehicle 2 when controlled by a cruise control aiming to keep the vehicle speed V2 at a target set speed V3. Since the distance D1 between the first vehicle 2 and the second vehicle 1 is small, there is a risk that the second vehicle 1 will overtake the first vehicle 2. Accordingly, FIG. 2 corresponds to a rear traffic condition indicating a risk of the first vehicle 2 being overtaken by the second vehicle 1. As shown in FIG. 2, the target set speed V3 is not reduced before the first vehicle 2 reaches the descending road condition Z. Once the descending road condition Z is reached, the first vehicle 2 starts descending and thus picks up speed. When the speed of the first vehicle 1 reached the road speed limit V1, the cruise control applies the brakes of the vehicle to prevent further speed increase. Once the first vehicle 2 leaves the descending road condition Z, the brakes are released and the vehicle speed V2 gradually falls for a certain period of time, until the vehicle speed V2 again reaches the target set speed V3.

The risk of overtaking increases with increasing speed difference between the first vehicle 2 and the second vehicle 1 (higher speed of the second vehicle 1 than the speed of the first vehicle 2). If the fuel saving strategy for descending road conditions Z would be applied by the cruise control system before the descent, it would introduce an increased risk of the first vehicle 2 being overtaken by the second vehicle 1, since the speed of the first vehicle 2 falls before the descending road condition Z when the target set speed V3 is reduced. However, the present disclosure teaches a modified control strategy, wherein the risk of being overtaken is assessed and a decision on whether to lower the target set speed V3 ahead of the descent for fuel savings is made based on the outcome of the overtaking risk assessment to reduce target set speed V3 only if there is no risk of overtaking. As shown in the scenario of FIG. 2, the risk assessment results in the target set speed V3 not being reduced for fuel savings before reaching the descending road condition Z since the second vehicle 1 is too close to the first vehicle 2 and/or drives much faster than the first vehicle 2, such that a risk of being overtaken is determined.

Figure 3:
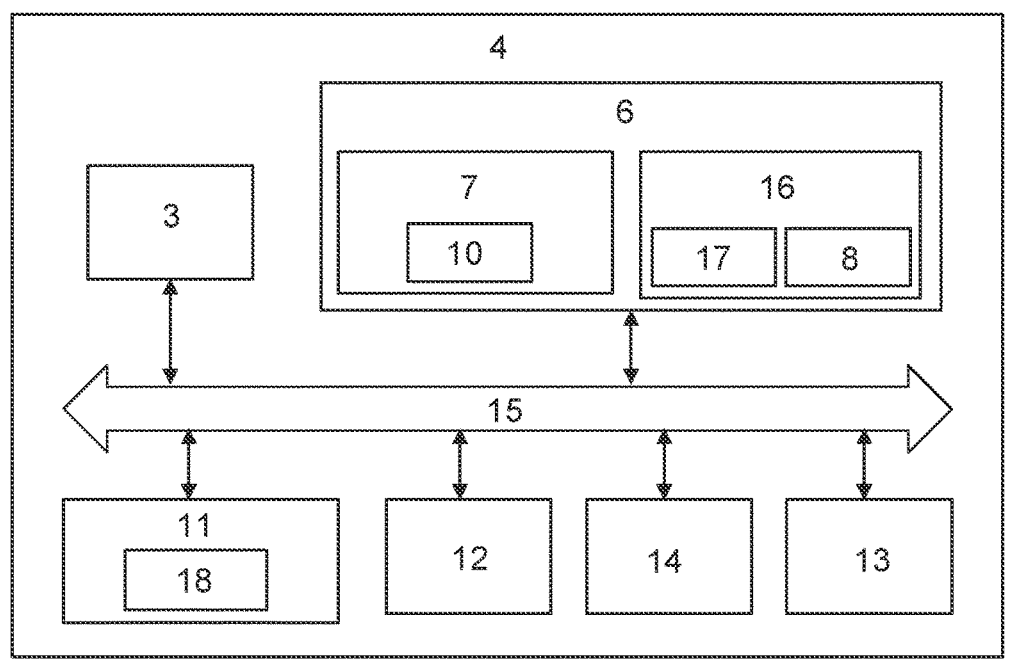
FIG. 3 is a schematic diagram of an exemplary computer system for implementing examples disclosed herein, according to one example.
Figure 4:
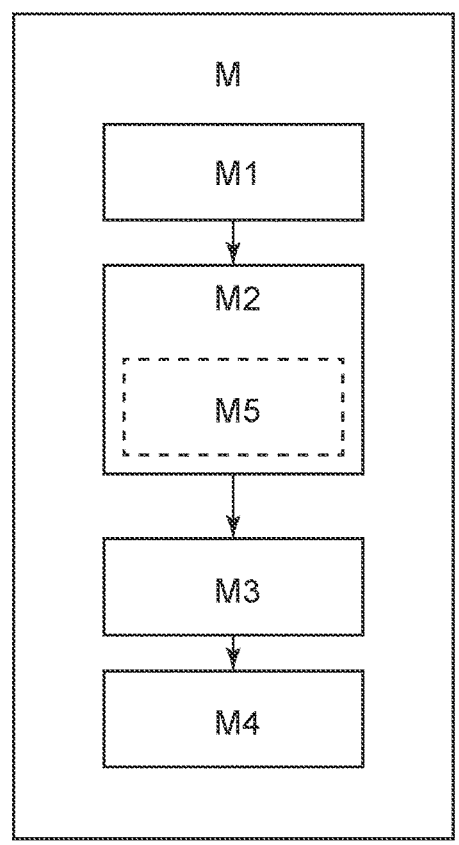
FIG. 4 is a flow chart of an exemplary method according to one example.

Accordingly, the present disclosure relates to a computer-implemented method M for controlling speed of a first vehicle 2. The method M is schematically illustrated in FIG. 4. Reference is also made to FIG. 3, illustrating a computer system 4. The method comprises:
   a) controlling M1, by a processor device 3 of the computer system 4, a prime mover of the first vehicle 2 to operate the first vehicle 2 at a target set speed,
   b) determining M2, by the processor device 3, a rear traffic condition indicating whether there is a risk of being overtaken by a second vehicle 1 travelling behind the first vehicle 2,
   c) determining M3, by the processor device 3, a topography of an upcoming road to be travelled by the first vehicle 2, and
   d) reducing M4, by the processor device 3, the target set speed of the first vehicle 2 from a nominal set speed V4, said nominal set speed V4 being the current speed of the first vehicle 2, to a reduced set speed V5, in response to the topography indicating a descending road condition Z and the rear traffic condition not indicating a risk of being overtaken by the second vehicle 1 before arriving at the descending road condition Z.

Said determination M2 of the rear traffic condition may comprise:
   obtaining M5, by the processor device 3, distance information from a rear distance sensor 5 of the first vehicle 2, said distance information describing at least a current distance between the first vehicle 2 and the second vehicle 1, and
   processing, by the processor device 3, the distance information to determine the rear traffic condition based on at least the distance information.

Any other suitable means for determining the rear traffic condition could alternatively be used instead of the rear distance sensor 5. For example, a rear camera could be used to capture two-dimensional (2d) or three-dimensional (3d) images showing the second vehicle 1 travelling behind the first vehicle 2. The rear traffic condition could be derived from the 2d/3d images by an artificial intelligence engine trained to distinguish a situation where an overtaking risk is present from a situation in which no overtaking risk is present. Alternatively, photogrammetry could be used on the photos to track features between photos and determine the distance to the second vehicle to thereby determine whether a risk of overtaking exists.

The method M may further comprise:
   f) increasing, by the processor device 3, the target set speed of the first vehicle 2 from the reduced set speed V5 to the road speed limit V1 of the first vehicle, in response to the first vehicle 2 not having arrived at the descending road condition Z and the rear traffic condition indicating a risk of being overtaken by the second vehicle 1. Alternatively, the method M may comprise:
   f) increasing, by the processor device 3, the target set speed of the first vehicle 2 from the reduced set speed V5 to the nominal set speed V4, in response to the first vehicle 2 not having arrived at the descending road condition Z and the rear traffic condition indicating a risk of being overtaken by the second vehicle 1.

The rear traffic condition may be determined to indicate a risk of being overtaken by the second vehicle before arriving at the descending road condition Z in response to a distance D1 between the second vehicle 1 and the first vehicle 2 being below a predetermined rear distance limit D2.

The rear distance limit D2 may be dynamically adjusted by the processor device 3 in response to a change in road speed limit V1.

The rear traffic condition may be determined to indicate a risk of being overtaken by the second vehicle 1 before arriving at the descending road condition Z in response to a speed difference between the first vehicle 2 and the second vehicle 1 exceeding a speed difference limit. The speed difference limit could be a static limit, or it could be dynamically determined based on one or more of the speed of the first vehicle 2, the distance D1 between the first vehicle 2 and the second vehicle 1, and the distance D3 between the first vehicle 2 and the descending road condition Z.

The reduced set speed V5 may be determined by estimating, by the processor device 3, a speed increase of the first vehicle 2 based on a vertical extent of the descending road condition Z, wherein a difference between the reduced set speed V5 and the current speed of the first vehicle 2 is proportional to the estimated speed increase of the first vehicle 2.

A vehicle 2 may be provided, said vehicle 2 comprising the processor device 3 to perform the computer-implemented method M discussed above and specified in the claims.

Also, a computer program product may be provided, said computer program product comprising program code for performing, when executed by the processor device 3, the computer-implemented method M discussed above and specified in the claims.

Further, a control system may be provided, said control system comprising one or more control units configured to perform the computer-implemented method M discussed above and specified in the claims.

A non-transitory computer-readable storage medium may be provided, said storage medium comprising instructions, which when executed by the processor device 3, cause the processor device 3 to perform the computer-implemented method discussed above and specified in the claims.

FIG. 3 is a schematic diagram of a computer system 4 for implementing examples disclosed herein. The computer system 4 is adapted to execute instructions from a computer-readable medium to perform these and/or any of the functions or processing described herein. The computer system 4 may be connected (e.g., networked) to other machines in a LAN, an intranet, an extranet, or the Internet. While only a single device is illustrated, the computer system 4 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 4 may comprise at least one computing device or electronic device capable of including firmware, hardware, and/or executing software instructions to implement the functionality described herein. The computer system 4 may include a processor device 3 (may also be referred to as a control unit), a memory 6, and a system bus 15. The computer system 4 may include at least one computing device having the processor device 3. The system bus 15 provides an interface for system components including, but not limited to, the memory 6 and the processor device 3. The processor device 3 may include any number of hardware components for conducting data or signal processing or for executing computer code stored in memory 6. The processor device 3 (e.g., control unit) may for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device 3 may further include computer executable code that controls operation of the programmable device.

The system bus 15 may be any of several types of bus structures that may further interconnect to a memory bus (with or without a memory controller), a peripheral bus, and/or a local bus using any of a variety of bus architectures. The memory 6 may be one or more devices for storing data and/or computer code for completing or facilitating methods described herein. The memory 6 may include database components, object code components, script components, or other types of information structure for supporting the various activities herein. Any distributed or local memory device may be utilized with the systems and methods of this description. The memory 6 may be communicably connected to the processor device 3 (e.g., via a circuit or any other wired, wireless, or network connection) and may include computer code for executing one or more processes described herein. The memory 6 may include non-volatile memory 7 (e.g., read-only memory (ROM), erasable programmable read-only memory (EPROM), electrically erasable programmable read-only memory (EEPROM), etc.), and volatile memory 16 (e.g., random-access memory (RAM)), or any other medium which can be used to carry or store desired program code in the form of machine-executable instructions or data structures and which can be accessed by a computer or other machine with a processor device 3. A basic input/output system (BIOS) 10 may be stored in the non-volatile memory 7 and can include the basic routines that help to transfer information between elements within the computer system 4.

The computer system 4 may further include or be coupled to a non-transitory computer-readable storage medium such as the storage device 11, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 11 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 11 and/or in the volatile memory 16, which may include an operating system 17 and/or one or more program modules 8. All or a portion of the examples disclosed herein may be implemented as a computer program product 18 stored on a transitory or non-transitory computer-usable or computer-readable storage medium (e.g., single medium or multiple media), such as the storage device 11, which includes complex programming instructions (e.g., complex computer-readable program code) to cause the processor device 3 to carry out the steps described herein. Thus, the computer-readable program code can comprise software instructions for implementing the functionality of the examples described herein when executed by the processor device 3. The processor device 3 may serve as a controller or control system for the computer system 4 that is to implement the functionality described herein.

The computer system 4 also may include an input device interface 12 (e.g., input device interface and/or output device interface). The input device interface 12 may be configured to receive input and selections to be communicated to the computer system 4 when executing instructions, such as from a keyboard, mouse, touch-sensitive surface, etc. Such input devices may be connected to the processor device 3 through the input device interface 12 coupled to the system bus 15 but can be connected through other interfaces such as a parallel port, an Institute of Electrical and Electronic Engineers (IEEE) 1394 serial port, a Universal Serial Bus (USB) port, an IR interface, and the like. The computer system 4 may include an output device interface 14 configured to forward output, such as to a display, a video display unit (e.g., a liquid crystal display (LCD) or a cathode ray tube (CRT)). The computer system 4 may also include a communications interface 13 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer system comprising a processor device configured to:
    control a prime mover of the first vehicle to operate the first vehicle at a target set speed,
    determine a rear traffic condition indicating whether there is a risk of being overtaken by a second vehicle travelling behind the first vehicle,
    determine a topography of an upcoming road to be travelled by the first vehicle, and
    reduce the target set speed of the first vehicle from a nominal set speed, said nominal set speed being the current speed of the first vehicle, to a reduced set speed, in response to the topography indicating a descending road condition and the rear traffic condition not indicating a risk of being overtaken by the second vehicle before arriving at the descending road condition.

2. A computer-implemented method for controlling speed of a first vehicle, the method comprising:
    controlling, by a processor device of a computer system, a prime mover of the first vehicle to operate the first vehicle at a target set speed,
    determining, by the processor device, a rear traffic condition indicating whether there is a risk of being overtaken by a second vehicle travelling behind the first vehicle,
    determining, by the processor device, a topography of an upcoming road to be travelled by the first vehicle, and
    reducing, by the processor device, the target set speed of the first vehicle from a nominal set speed, said nominal set speed being the current speed of the first vehicle, to a reduced set speed, in response to the topography indicating a descending road condition and the rear traffic condition not indicating a risk of being overtaken by the second vehicle before arriving at the descending road condition.

3. The method of claim 2, wherein the step of determining the rear traffic condition comprises:

obtaining, by the processor device, distance information from a rear distance sensor of the first vehicle, said distance information describing at least a current distance between the first vehicle and the second vehicle, and processing, by the processor device, the distance information to determine the rear traffic condition based on at least the distance information.

4. The method of claim 2, further comprising:

increasing, by the processor device, the target set speed of the first vehicle from the reduced set speed to a current road speed limit, in response to the first vehicle not having arrived at the descending road condition and the rear traffic condition indicating a risk of being overtaken by the second vehicle.

5. The method of claim 2, further comprising:

increasing, by the processor device, the target set speed of the first vehicle from the reduced set speed to the nominal set speed, in response to the first vehicle not having arrived at the descending road condition and the rear traffic condition indicating a risk of being overtaken by the second vehicle.

6. The method of claim 2, wherein the rear traffic condition is determined to indicate a risk of being overtaken by the second vehicle before arriving at the descending road condition in response to a distance between the second vehicle and the first vehicle being below a predetermined rear distance limit.

7. The method of claim 6, wherein the rear distance limit is dynamically adjusted by the processor device in response to a change in road speed limit.

8. The method of claim 2, wherein the rear traffic condition is determined to indicate a risk of being overtaken by the second vehicle before arriving at the descending road condition in response to a speed difference between the first vehicle and the second vehicle exceeding a speed difference limit.

9. The method of claim 2, wherein the reduced set speed is determined by:

estimating, by the processor device, a speed increase of the first vehicle based on a vertical extent of the descending road condition, wherein a difference between the reduced set speed and the current speed of the first vehicle is proportional to the estimated speed increase of the first vehicle.

10. A vehicle comprising the processor device to perform the method of claim 2.

11. A computer program product comprising program code for performing, when executed by the processor device, the method of claim 2.

12. A control system comprising one or more control units configured to perform the method of claim 2.

13. A non-transitory computer-readable storage medium comprising instructions, which when executed by the processor device, cause the processor device to perform the method of claim 2.

* * * * *